US005922439A

United States Patent [19]

Bredenick et al.

[11] Patent Number: 5,922,439

[45] Date of Patent: Jul. 13, 1999

[54] PAPER TOWEL WITH DUAL LEVEL DIAGONAL INFUNDIBULATE STRIAE OF SLITTED ELONGATE HEXAGONAL BOSSES

[75] Inventors: Kenneth E. Bredenick, Neenah; Edward J. Giesler, Sr., Little Suamico; Chester W. Gooding, Jr., Neenah; Kambiz B. Makoui, Menasha, all of Wis.

[73] Assignee: Fort James Corporation, Deerfield, Ill.

[ * ] Notice: This patent is subject to a terminal disclaimer.

[21] Appl. No.: 08/969,693

[22] Filed: Nov. 13, 1997

Related U.S. Application Data

[63] Continuation of application No. 08/654,877, May 29, 1996, abandoned, which is a continuation of application No. 08/487,861, Jun. 7, 1995, Pat. No. 5,861,081, which is a division of application No. 08/038,982, Mar. 29, 1993, Pat. No. 5,458,950.

[51] Int. Cl.$^{6}$ ............................... B32B 3/28; B32B 29/00

[52] U.S. Cl. .......................... 428/154; 428/153; 428/166; 428/177; 428/178; 428/184; 428/212; 428/332

[58] Field of Search .................................... 428/153, 154, 428/166, 177, 178, 184, 212, 332

[56] References Cited

U.S. PATENT DOCUMENTS 5,458,950 10/1995 Bredenick et al. ..................... 428/154

*Primary Examiner*—Richard Weisberger

*Attorney, Agent, or Firm*—Finnegan, Henderson, Farabow, Garrett, & Dunner L.L.P.

[57] ABSTRACT

A paper toweling which provides a combination of strength, bulk and absorbency while presenting an attractive appearance. Included are a single ply paper towel having areas of light and heavy embossing perforations which form diamond shaped islands of heavy embossing perforations surrounded by intersecting bands of light bosses.

18 Claims, 16 Drawing Sheets

MACHINE DIRECTION →

PAPER TOWEL WITH DUAL LEVEL DIAGONAL INFUNDIBULATE STRIAE OF SLITTED ELONGATE HEXAGONAL BOSSES

This application is a continuation, of application Ser. No. 08/654,877, filed May 29, 1996, now abandoned which is a continuation of Ser. No. 08/487,861, filed Jun. 7, 1995, now U.S. Pat. No. 5,861,081 and is a divisional of Ser. No. 08/038,982, filed Mar. 29, 1993, now U.S. Pat. No. 5,458, 950.

BACKGROUND OF THE INVENTION

1. Field of the Invention

This invention relates to a paper toweling which provides an improved combination of strength, bulk and absorbency while presenting an attractive appearance. This invention further relates to a paperlike web having perforate and non-perforate boss elements which are arranged to incorporate strength control while enhancing bulk. The invention further relates to single ply paper towels having areas of light bosses and heavy boss perforations which form islands of heavy boss perforations surrounded by intersecting bands of light bosses.

2. Background of the Invention

Roll paper toweling such as that used in commercial, "away-from-home" dispensers, is a relatively modest product normally sold almost exclusively on the basis of cost as the purchaser is rarely the user. Accordingly, since improved performance can only rarely justify even a minimal increase in cost, techniques for improving the quality of this product must usually meet the most stringent of economic criteria, i.e., they can add nothing to the marginal cost of production.

SUMMARY OF THE INVENTION

The advantages and purposes of the invention will be set forth in part in the description which follows and in part will be obvious from the description, or may be learned by practice of the invention. The advantages and purposes of the invention may be realized and attained by means of the instrumentalities and combinations particularly pointed out in the appended claims.

To achieve the advantages and in according with the purpose of the invention, as embodied and broadly described herein, the invention comprises:

a paperlike web of randomized cellulosic fibers having a basis weight of from about 8 to about 60 lbs per 3000 sq ft ream, the web having a plurality of infundibulate bosses formed therethrough. The bosses fall into two classes, light and heavy, the light bosses being from about 0.002 to 0.040 inch less in height than the heavy. The heavy bosses should be perforate while the light bosses are preferably lightly perforate but need not be so to provide substantial benefit. The boss-perforations form an array of islands comprised primarily of a plurality of heavy-boss-perforations surrounded by intersecting bands of light boss-perforations. In this specification, the term boss should be understood to comprehend all bosses whether perforate or not.

In another aspect the invention comprises a single ply paper towel having the characteristics of the aforementioned web.

Additional advantages of the invention will be set forth in part in the description which follows, and in part will be obvious from the description, or may be learned by practice of the invention. The advantages of the invention will be realized and attained by means of the elements and combination particularly pointed out in the appended claims.

BRIEF DESCRIPTION OF THE DRAWINGS

The accompanying drawings, which are incorporated in and constitute a part of the specification, illustrate various aspects of the invention and, together with the description, serve to explain the principles of the invention. In the drawings.

DETAILED DESCRIPTION

The paper product of the present invention provides improved strength control and absorbency while enhancing bulk. The towels of the invention can be used in individual sheet form or in roll form. They are more preferably used in roll form.

The preferred toweling has elongate hexagonal infundibulate bosses of two classes formed therein, light and heavy. One class of infundibulate bosses, the heavy bosses, have a depth of the elongate hexagonal emboss which is relatively deep from about 0.010 inch up to about 0.070 inch in depth. The depth of heavy emboss is more preferably from about 0.015 inch up to about 0.040 inch, most preferably from about 0.018 inch up to about 0.030 inch. The other class of infundibulate bosses, the light bosses, have a depth of the elongate hexagonal emboss which is relatively shallow from about 0.002 inch up to about 0.040 inch less in depth than the heavy bosses. The depth of light bosses is more preferably from about 0.004 inch up to about 0.015 inch less in depth than the heavy bosses, most preferably from about 0.005 inch up to about 0.010 inch.

In one preferred embodiment of the present invention, both the heavy and light bosses are perforated. In the heavy bosses, the perforations are slits which extend for substantially the majority of the entire length of the crown of the elongate hexagonal boss; while in the light bosses, the slits extend through less than a major portion of the crown of the elongate hexagonal boss. In other embodiments, the light bosses need not be perforate or slitted.

Figure 4:
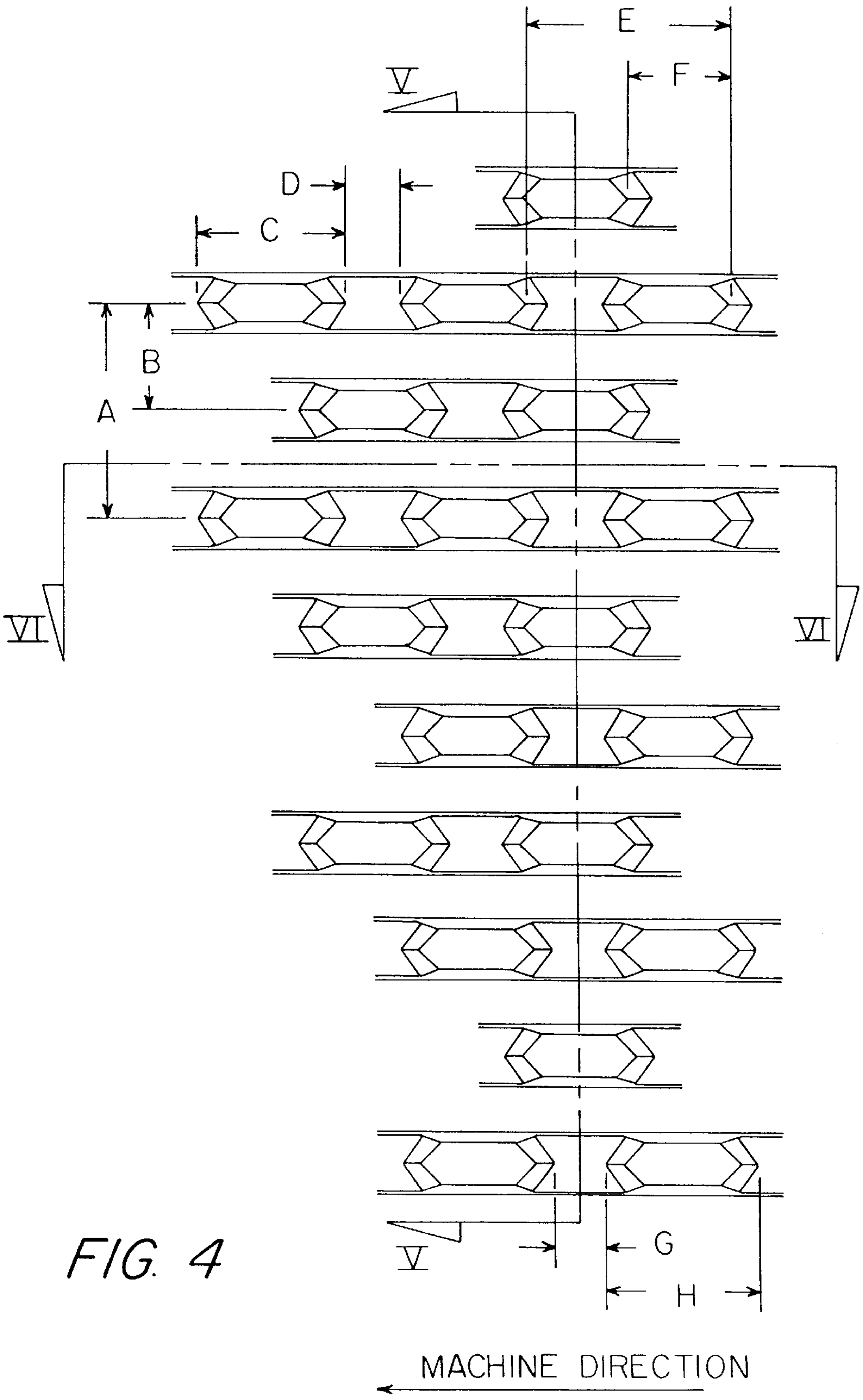
FIG. 4 is a schematic plan view illustrating dimensions and configuration of the dual level array of infundibulate bosses according to preferred embodiments of the present invention.

According to a preferred embodiment of the present invention, bosses of these two categories are arranged in striae to form an array of islands of heavy bosses on a field of light bosses. For a schematic illustration of one preferred embodiment, see FIG. 7. Typically, the heavy bosses and the light bosses will have substantially the same shape and will differ primarily in the depth of emboss. The bosses are typically, at the base, elongate hexagons of from about 0.075 inch in length up to about 0.140 in length, preferably from about 0.080 inch to about 0.125 inch, and most preferably from about 0.090 inch to about 0.110 inch. The heavy bosses typically have a width from about 0.020 inch to about 0.060 inch, preferably from about 0.030 inch to about 0.055 inch, most preferably from about 0.040 to about 0.050 inch. One preferred embodiment is illustrated in FIG. 4.

In preferred embodiments, both the base and the crown will be elongate hexagons joined by two relatively planar walls sloping inwardly and upwardly. The first, i.e., the walls forming the narrow ends, slope inward and upward at an angle of between about 60° and 85°, measured from the plane of the hexagonal base at the narrow ends of the hexagon, more preferably at an angle between about 65° and 80°, and most preferably between about 70° and 75°. The other slopes inwardly and upwardly at an angle of between about 70° and 87°, measured from the plane of the hexagonal base, more preferably at an angle between about 75° and 86°, and most preferably between about 80° and 85°.

In the heavy bosses, the length of the crown will be about 0.060 inch to about 0.090 inch, more preferably about 0.065 inch to about 0.085 inch, most preferably about 0.070 inch to about 0.080 inch. In the heavy bosses, the height of the crown will be about 0.010 to about 0.070 inch above the base of the hexagon, more preferably about 0.012 to about 0.050 inch, most preferably about 0.015 to about 0.030 inch.

In the light bosses, the length of the crown will be from about 0 to about 20% longer than the length of the crown in the heavy bosses, more preferably from about 3 to about 18% longer, and most preferably from about 5 to about 15% longer. In the light bosses, the crown will be from about 0.002 to about 0.040 inch less than the height of the heavy bosses, more preferably from about 0.003 about 0.020 inch less, and most preferably from about 0.0005 to about 0.015 inch less.

In the more preferred embodiments, the infundibulate bosses will be arrayed in staggered lines in which the individual infundibulate bosses are aligned narrow end to narrow end, the distance between adjacent tips being from about 0.020 to about 0.055 inch, more preferably from about 0.025 to about 0.050 inch, and most preferably from about 0.030 to about 0.040 inch; the distance between centers on next adjacent lines being from about 0.040 to about 0.150 inch, more preferably from about 0.050 to about 0.100 inch, most preferably from about 0.060 to about 0.090 inch. In one preferred embodiment, each infundibulate boss is displaced from the preceding boss in the line by from about 0.100 to about 0.200 inch, more preferably from about 0.125 to about 0.175 inch, and most preferably from about 0.130 to about 0.170 inch.

In the most preferred patterns, all of the infundibulate bosses are arrayed in the same uniform pattern and will have elongated hexagonal bases of substantially identical dimensions and configurations but for ease in manufacturing of the rolls the light bosses will be essentially truncated versions of the heavy bosses. The heavy bosses will form equilateral diamond shaped islands from about 5 to 12 bosses along each edge, more preferably from about 6 to 10 bosses, most preferably from about 6 to 8 bosses, separated from each other by diagonal intersecting lines of light bosses from about 2 to 10 boss lines in width (as measured in the cross-direction), more preferably from about 3 to 10 boss, most preferably from about 4 to 8 boss lines. In some preferred embodiments, the embossed sheet will be gap-calendared to a caliper of from 0.050 inch to about 0.180 inch per 8 sheets.

Figure 1:
FIG. 1 is a substantially lifesize photomacrograph taken normal to the plane of the toweling.
Figure 2:
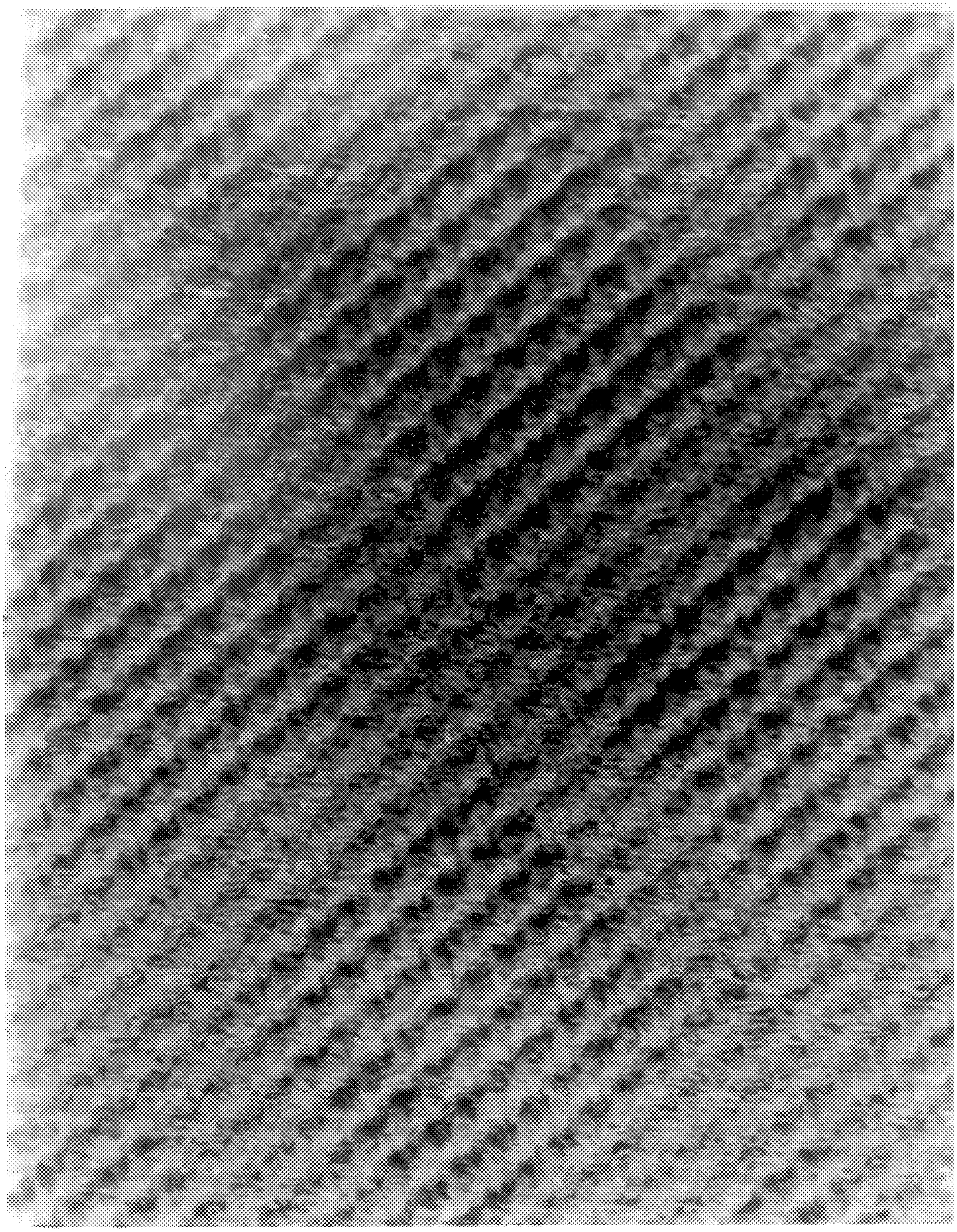
FIG. 2 is a photomicrograph of substantially 25× lifesize illustrating the arrangement of the infundibulate bosses comprising the fields and diamonds of the emboss pattern of toweling according to preferred embodiments of the present invention.

In FIG. 1 and 2, the diamond shaped islands surrounded by bands of lightly bossed towel are seen. FIG. 1 is a substantially lifesize photograph which shows the pattern of light and heavy bosses which are found within the diamond shaped islands; while FIG. 2 is the substantially the same islands at a magnification of about 25× lifesize.

Figure 3:
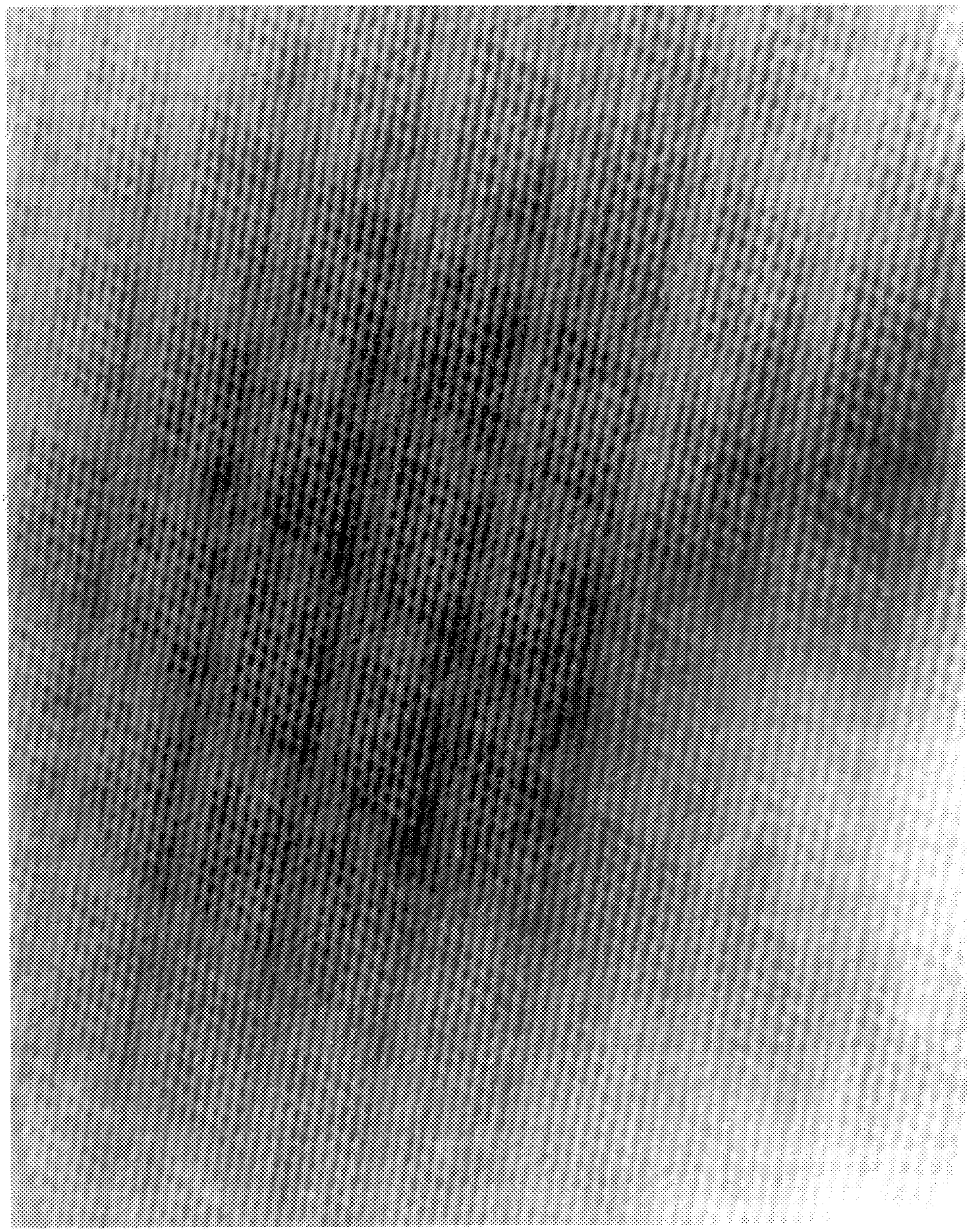
FIG. 3 is a substantially lifesize photomacrograph taken at an angle relative to the normal to the plane of the toweling to illustrating the "banded" appearance created by the dual level array of infundibulate bosses according to preferred embodiments of the present invention.

In FIG. 3, the substantially lifesize photograph has been realigned to show the banded effect which is produced by the diamond shaped islands and the criss-crossed lines of light bosses which separate these islands.

FIG. 4 which is a schematic of the configuration and dimensions of the bosses according to one preferred embodiment of the present invention. As can be seen from FIG. 4, the bosses, both heavy and light are elongated hexagons in shape. FIG. 4 further describes the dimension of this preferred embodiment of the invention.

Figure 5:
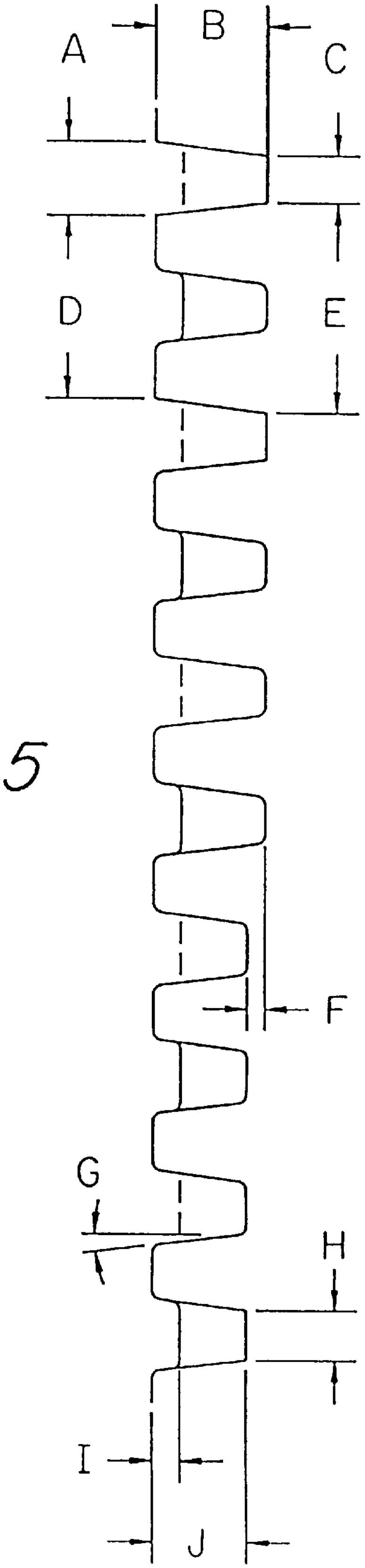
FIG. 5 is a schematic sectional view along line V—V of FIG. 4 illustrating the dimensions and configuration of the dual level array of infundibulate bosses according to preferred embodiments of the present invention.
Figure 6:
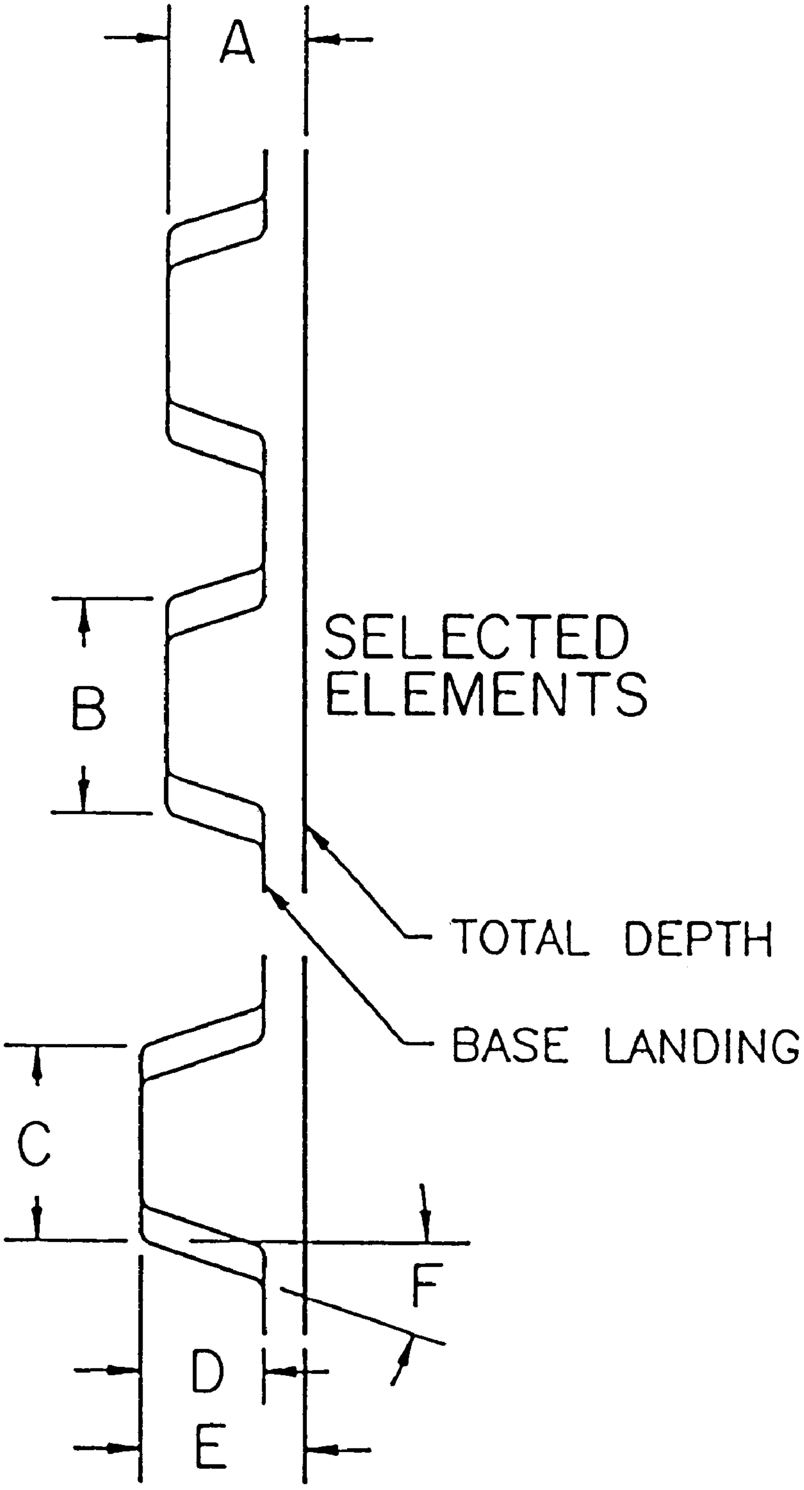
FIG. 6 is a schematic sectional view along line VI—VI of FIG. 4 illustrating the dimensions and configuration of the dual level array of infundibulate bosses according to preferred embodiments of the present invention.

FIGS. 5 and 6 are cross sectional representations of FIG. 4 and provide additional boss dimensions of preferred embodiments.

Figure 7:
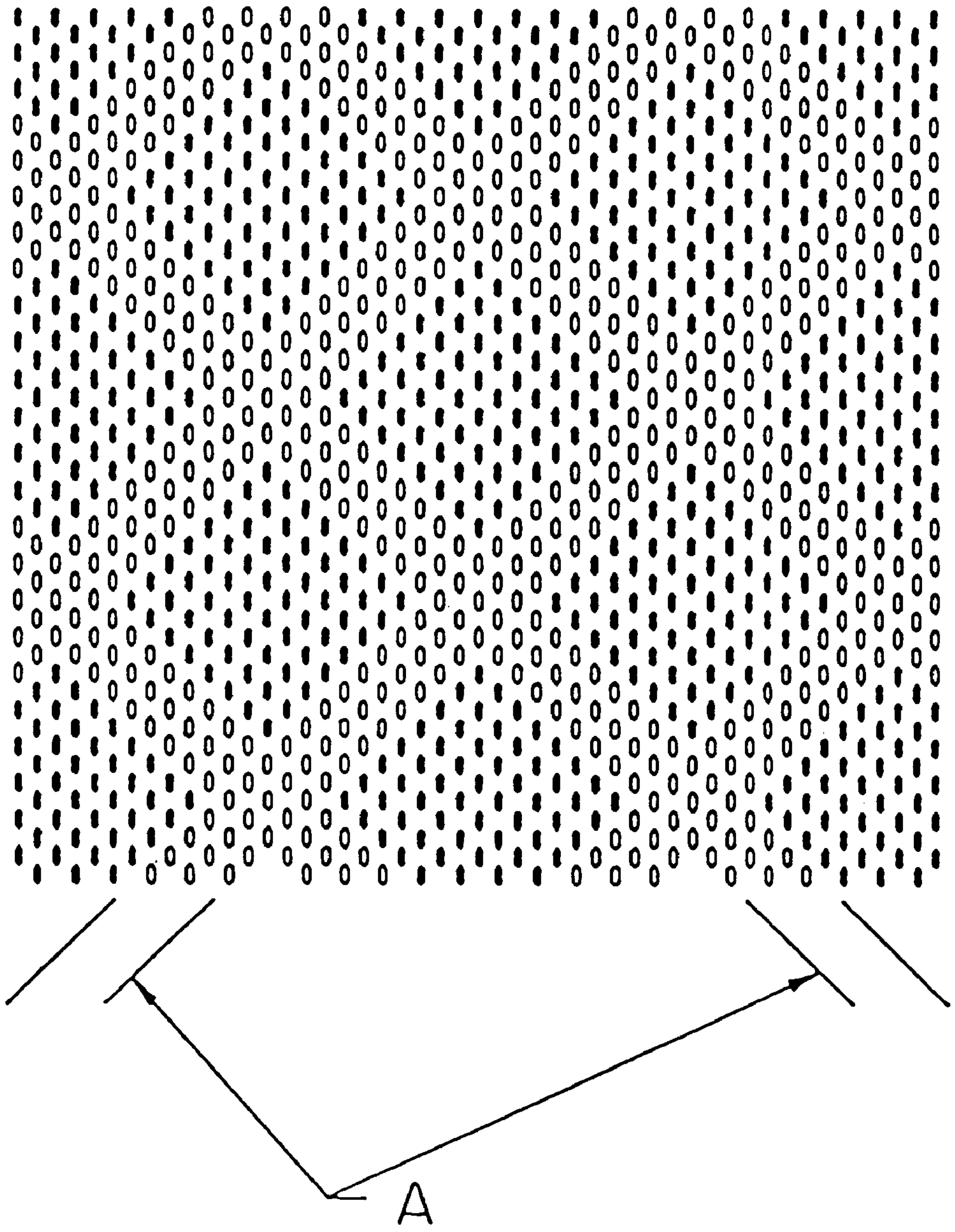
FIG. 7 is a schematic plan view illustrating the relative locations of the light and heavy bosses of the dual level array of infundibulate bosses according to preferred embodiments of the present invention.

FIG. 7 is a schematic representation of a most preferred light and heavy emboss pattern of the present invention. According to this embodiment, diamond shaped islands of heavy bosses are surrounded by a background of light bosses. According to other preferred embodiments of the present invention, the diamond shaped islands may include both light and heavy bosses.

Figure 8A:
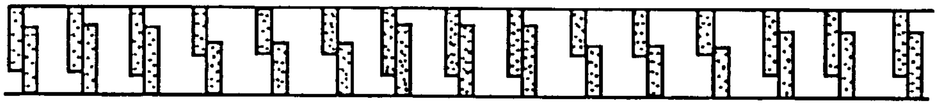
FIG. 8 is a schematic sectional view illustrating the meshing of the interpenetrating emboss elements at full engagement of the roll embossed rolls used to emboss into the toweling the dual level array of infundibulate bosses according to center float embodiments of the present invention.
Figure 8B:
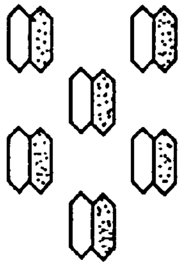
Figure 8C:
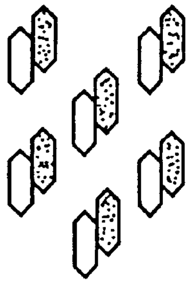
Figure 9A:
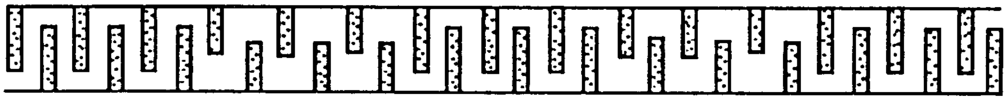
FIG. 9 is a schematic sectional view illustrating the meshing of the interpenetrating emboss elements at full engagement of the roll embossed rolls used to emboss into the toweling the dual level array of infundibulate bosses according to side engagement embodiments of the present invention.
Figure 9B:
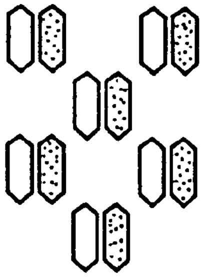
Figure 9C:
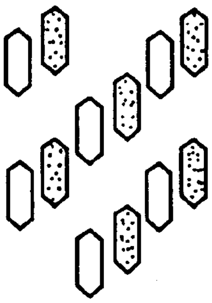

FIGS. 8 and 9 represent the engagement positions of the embossing elements which may be used to form the slits in both the heavy and light bosses. In both FIGS. 8 and 9, a schematic representation of the members is shown at the top of the figure under the title. The areas having significant overlap of the members are representative of the heavy bosses with those areas of less overlap representing light bosses.

Figure 10:
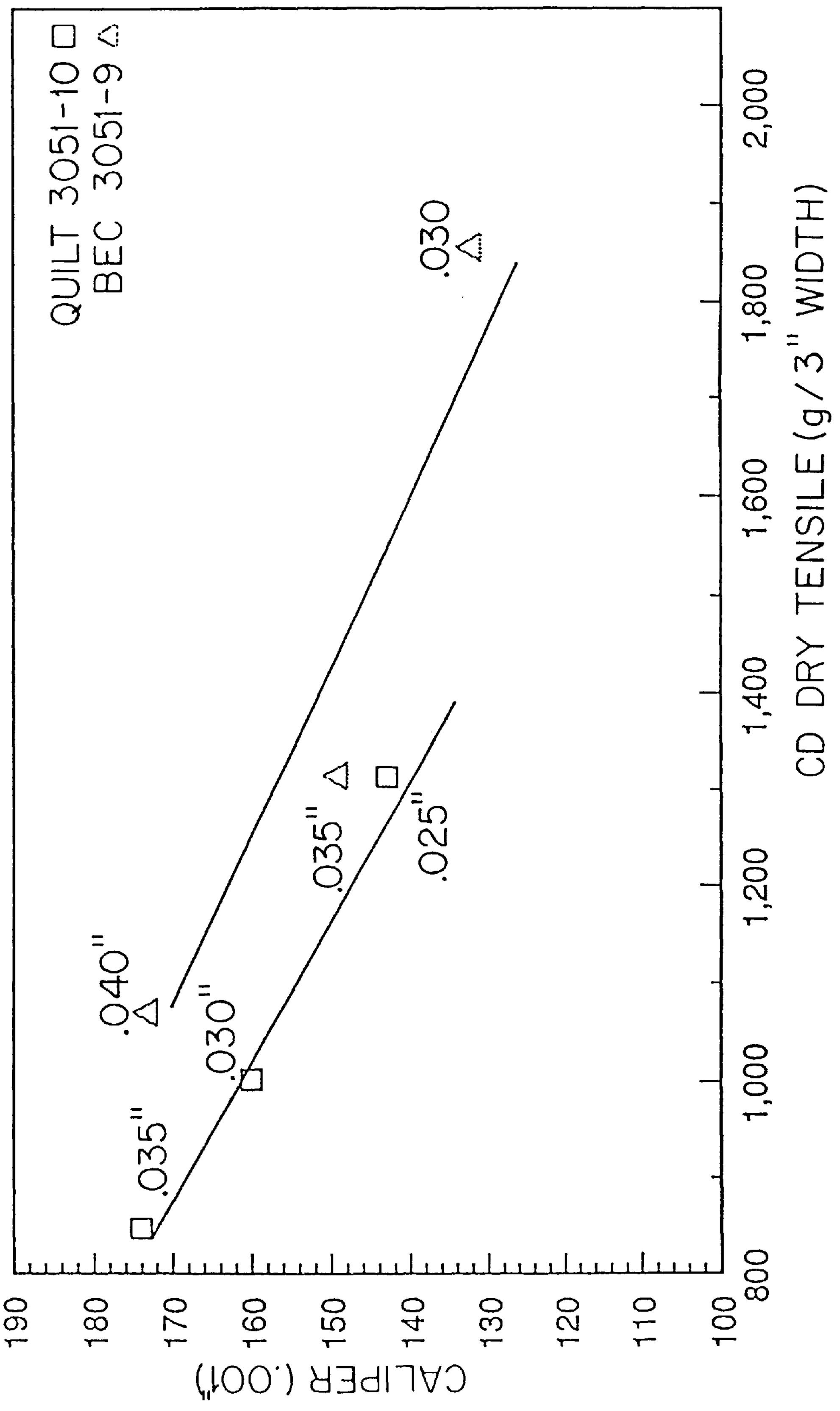
FIG. 10 is a graph illustrating the relationship between bulk and strength observed in toweling embossed according to the preferred embodiments of the present invention.
Figure 11:
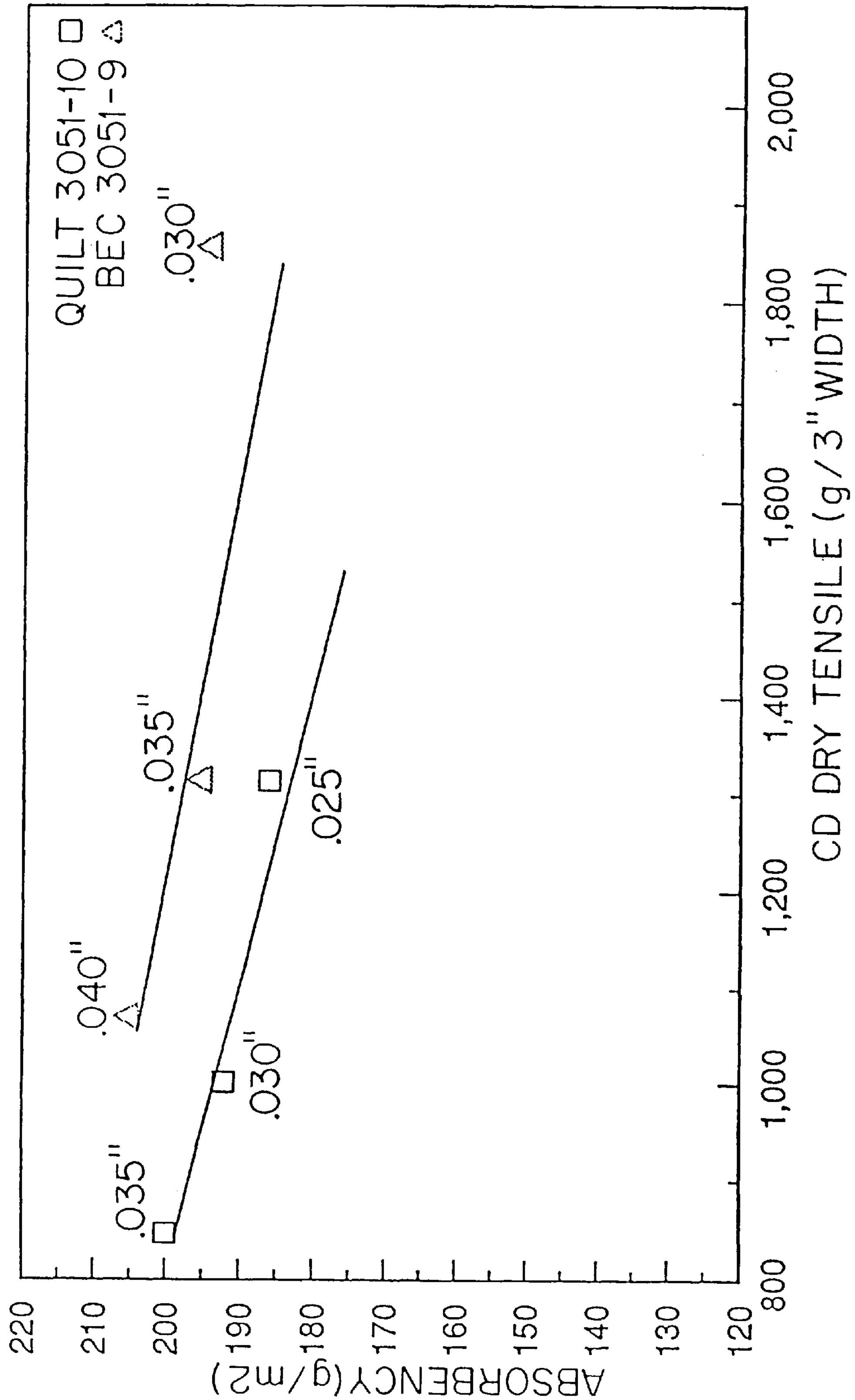
FIG. 11 is a graph illustrating the relationship between absorbency and strength observed in toweling embossed according to the preferred embodiments of the present invention.

FIGS. 10 and 11 will be discussed below in the examples.

Figure 12:
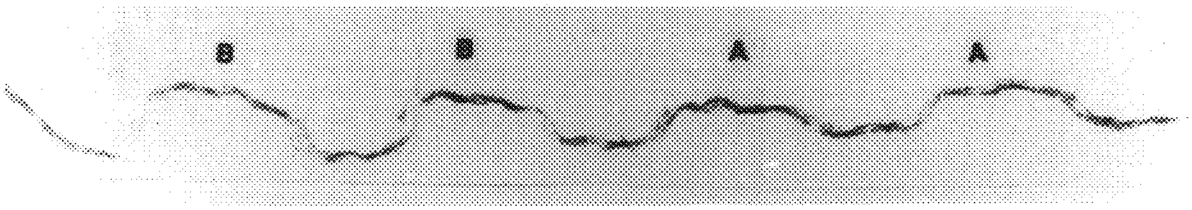
FIG. 12 is a photomicrograph of substantially 50× lifesize illustrating the nature of both the light and heavy infundibulate perforated bosses of preferred embodiments of the present invention as seen along a line at an angle of 45° with respect to the machine direction.
Figure 13:
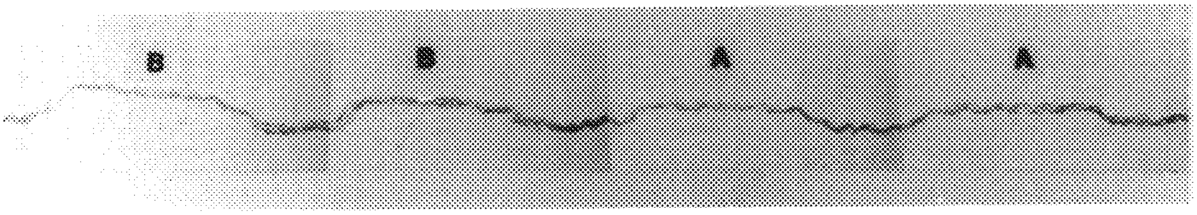
FIG. 13 is a photomicrograph of substantially 25× lifesize corresponding to FIG. 12 taken perpendicular to the machine direction.
Figure 14:
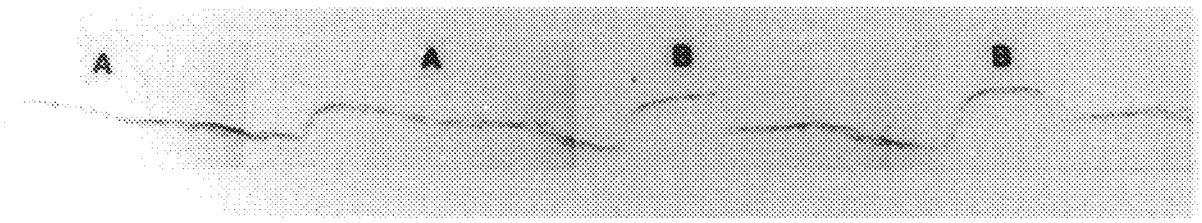
FIG. 14 is a photomicrograph of substantially 25× lifesize corresponding to FIG. 12 taken perpendicular to the cross direction.

FIGS. 12–14 represent micrographs of a towel which was made according to the present invention. The micrographs show both the cross direction and machine direction representation of the both heavy (macro) and light (micro) bosses.

Figure 15A:
FIG. 15 is a scanning electron micrograph at about 15× lifesize of perforate portions of the infundibulate bosses of the toweling embossed according to the preferred embodiments of the present invention comparing light and heavy bosses and illustrating the difference between the slits in the two classes of bosses.
Figure 15B:
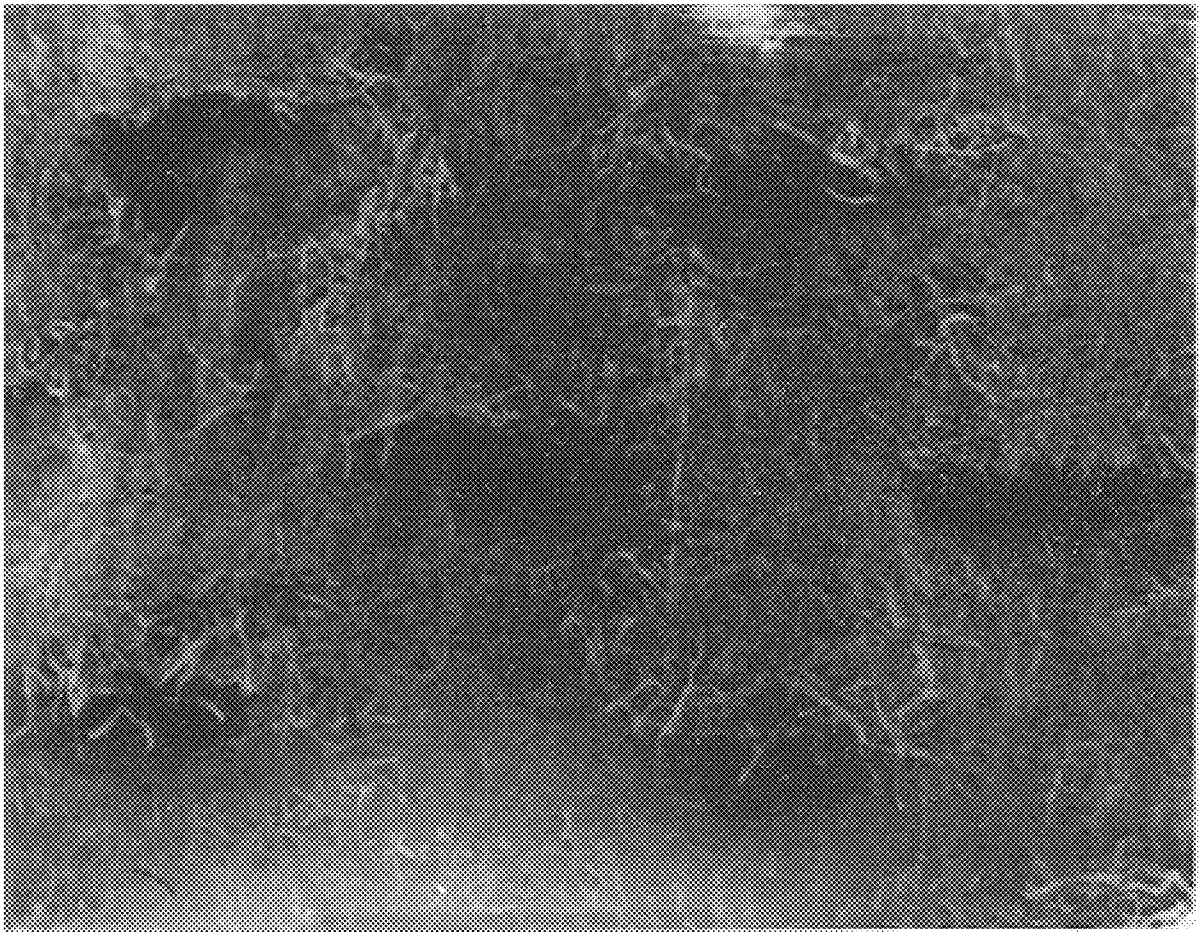

FIG. 15 is a scanning electron micrograph of the heavy and light bosses in a towel which was made according to the present invention. The micrograph shows not only the differences in depth between the bosses but also the slitted effect which was described above.

The following examples are not to be construed as limiting the invention as described herein.

EXAMPLES

Experimental

The basesheets used for this example were formed on a conventional paper machine at the basis weight of 29.6 lb/ream. The basesheets were made using conventional wet press forming technology in a crescent former configuration. The furnish used to make these basesheets consisted of 50/50 percent weight ratio of bleached northern softwood kraft and bleached northern hardwood kraft pulp. The fiber blend for this pulp consisted of Spruce and/or Hemlock, Hard Pine species for softwood pulp and Maple, Birch, and Populous species for hardwood pulp. The wet strength resin used for this trial was Kymene A at the add-on level of 16 lb/ton and the sheets were dry creped (15% ratio) using a doctor blade with a blade bevel of 15°.

The embossing trial was conducted on a pilot plant converting line using engraved and machined emboss rolls to convert the basesheet parent rolls into finished products using this new design. This embossing design called "BEC", has emboss elements at two different heights, arranged in striae to form an array of islands of heavy bosses (taller elements) on a field of light bosses (shorter elements). For this example, the upper and lower embossed rolls were aligned in the center-float configuration using full step pattern alignment, as seen in FIG. 9. Products were embossed at three different penetration depths of 0.030, 0.035 and 0.040 mils of the taller emboss elements. For comparison purposes, emboss rolls with a conventional design, referred to as "Quilt," which consisted of emboss elements at a uniform height, were used to make control samples. The rolls were engraved only but not machined so all emboss elements had substantially the same height.

Testing

The embossed samples were oven cured at 80° C. for 30 minutes and conditioned in a constant temperature and humidity room for eight hours before testing. These samples were tested for caliper, tensile strength in cross machine direction and absorbency. Neither sample was calendared. The results are reported in Table 1, below and FIGS. 10 and 11. The test methods used are described below.

Absorbency

The absorption capacity in a given example was determined by a fluid absorption tester (Gravimetric Absorption Tester) which measures the ability of a material to absorb as much fluid as it will hold without being flooded. A material sample was placed over a point source plate and liquid from a reservoir was allowed to flow through the plate as it was absorbed by the material undergoing the test. The weight of the reservoir was recorded before the test and again after the sample no longer absorbed additional fluid and had reached its maximum fluid saturation without flooding. The liquid absorption ratio was calculated and reported as the amount of fluid in grams absorbed per gram of the material sample. Liquid absorption ratio is independent of the sample's actual weight. Area capacity is a derived number indicating the liquid holding capacity of a sample and is expressed grams per square meter. Area capacity is calculated by multiplying the absorptive capacity of the test material expressed grams of liquid per gram of material by its basis weight in grams per square meter.

Caliper

The caliper of a stack of 8-ply thick samples (3"×3") was measured between the platen and anvil of the electronic thickness tester and recorded to the nearest 0.1 thousandths of an inch. The gage used is the Thwing-Albert Electronic Caliper Gage, which has a confining pressure of 83.5 g/cm and a dwell time of 1.9 seconds.

Tensile

The tensile testing is done with an Instron tensile tester series 4261. A test specimen 3" wide and 5" long was obtained from cross direction of the embossed sheet. The test specimen was tested by setting the cross head speed at 2"/min. and jaw length (distance between the clamps) of 4" and values reported in grams per 3" wide sample.

Results

Test results are shown in attached FIGS. 10 and 11 and Table 1, below. FIG. 10 shows a plot showing the caliper vs. cross machine (CD) dry tensile. It should be noted that at a given strength, the caliper of the sheet embossed with the "BEC" pattern is higher than the caliper of the samples embossed with the "Quilt" pattern. This indicates that the "BEC" pattern can have a higher strength at a given caliper.

FIG. 11 shows a plot of absorbency v. (CD) dry tensile. It should be noted that at a given strength level, material embossed with "BEC" pattern is higher in absorption properties than the samples embossed with the "Quilt" pattern. It is thought that this increased absorption can be attributed to a higher penetration level of the longer emboss elements of "BEC" pattern, leading to more localized delamination of the fibrous structure, resulting in a higher absorption capacity.

TABLE 1

| Basesheet | Pattern | Penetration (.001") | B.W.* lb/ream | Caliper per 8 sheets (mils) | CD Dry Tensile g. per 3" | Abs. g/m$^2$ |
|---|---|---|---|---|---|---|
| 3051-10 | Quilt | 25 | 29.02 | 143 | 1313 | 186 |
| | | 30 | 29.35 | 160 | 1001 | 192 |
| | | 35 | 28.09 | 174 | 845 | 200 |
| 3051-9 | BEC | 30 | 29.16 | 132 | 1855 | 194 |
| | | 35 | 28.72 | 149 | 1314 | 195 |
| | | 40 | 29.22 | 173 | 1069 | 205 |

TABLE 1-continued

| Basesheet | Pattern | Penetration (.001") | B.W.* lb/ream | Caliper per 8 sheets (mils) | CD Dry Tensile g. per 3" | Abs. $g/m^2$ |
|---|---|---|---|---|---|---|

*per 3,000 sq./ft ream

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A paperlike web of randomized wet laid cellulosic fibers having a basis weight of from about 8 to about 60 lbs per 3000 sq. ft. ream, substantially the entire web having areas of higher strength and areas of lower strength, said areas of lower strength comprising a plurality of perforate infundibulate bosses formed therein; said areas of higher and lower strength falling into two classes, the areas of higher strength being from about 0.002 to 0.040 inch less in height than the areas of lower strength, said areas of lower strength forming an array of islands substantially surrounded by bands of areas of higher strength.

2. The web of claim 1, wherein said islands are diamond, circular, square, or polygonal shaped.

3. The web of claim 1, wherein said areas of higher strength are diamond shaped.

4. The web of claim 2, wherein said diamond shaped islands have from 7 to 12 bosses along each edge of the diamond.

5. The web of claim 3, wherein said islands are separated from one another by a distance equal to from 2 to 12 bosses.

6. The web of claim 1, wherein said perforate bosses have a depth of from about 0.010 inch up to about 0.070 inch.

7. The web of claim 1, wherein the bosses are elongate hexagons.

8. The web of claim 1, wherein the bosses have a base dimension from about 0.075 inch in length to about 0.140 inch in length.

9. The web of claim 8, wherein the bosses have a base dimension of from about 0.020 inch in width to about 0.060 inch in width.

10. The web of claim 1, wherein both the base and the crown of the bosses are elongate hexagons joined by two relatively planar walls, the first sloping inward and upward at an angle between about 60° and 85°, and the other sloping inward and upward at an angle between about 70° and 87°, measured from the plane of the hexagonal base.

11. The web of claim 1, wherein the areas of higher strength and areas of lower strength are arranged in staggered lines.

12. The web of claim 1, wherein said web is a single ply product.

13. The web of claim 1, wherein the web is a multi-ply product.

14. The web of claim 1, wherein said web is formed into a towel.

15. The web of claim 1, wherein said web is formed into a napkin.

16. The web of claim 1, wherein said web is formed into a wipe.

17. The web of claim 1, wherein said areas of higher strength are areas of nonperforate bosses.

18. The web of claim 1, wherein said areas of higher strength are areas of perforate bosses and wherein the perforations in the lower strength area bosses are at least 50% greater than the perforations in the higher strength areas.

* * * * *